United States Patent [19]

Cummings

[11] 4,148,192
[45] Apr. 10, 1979

[54] INTERNAL COMBUSTION ELECTRIC POWER HYBRID POWER PLANT

[76] Inventor: Troy A. Cummings, 912 Margate Ter., Chicago, Ill. 60640

[21] Appl. No.: 854,263

[22] Filed: Nov. 23, 1977

[51] Int. Cl.² .......................... F02B 73/00; B60K 1/00
[52] U.S. Cl. .................................... 60/716; 180/54 C; 180/65 A; 290/45; 290/50
[58] Field of Search ........................ 60/698, 716, 718; 180/54 C, 65 A; 290/8, 9, 45, 50

[56] References Cited

U.S. PATENT DOCUMENTS 4,021,677  5/1977  Rosen et al. .................. 180/65 A X

*Primary Examiner*—Gerald A. Michalsky
*Attorney, Agent, or Firm*—Kinzer, Plyer, Dorn & McEachran

[57] ABSTRACT

An internal combustion-electric motor hybrid power plant for an automotive vehicle. The power plant includes an internal combustion engine and a direct current electric motor generator which are connected to a drive shaft for the vehicle. A clutch mechanism is provided to connect the internal combustion engine, the direct current electric motor generator and the drive shaft for selectively engaging and disengaging the drive shaft with the internal combustion engine and the motor generator. A storage battery is electrically connected to the motor generator to supply current to and receive current therefrom. Thermoelectric semi-conductors are arranged to be heated by the waste heat of the internal combustion engine. These thermoelectric semi-conductors are electrically connected to the battery to supply current thereto. The thermoelectric semi-conductors are mounted in contact with the outer surfaces of the exhaust pipe of the internal combustion engine and also with the outer surfaces of the cylinder walls of the engine.

5 Claims, 5 Drawing Figures

INTERNAL COMBUSTION ELECTRIC POWER HYBRID POWER PLANT

BACKGROUND OF THE INVENTION

It requires only approximately 12 horsepower to maintain an automobile the size of a Volkswagon "BEETLE" moving at a constant speed of approximately 55 m.p.h. Of course, greater power is required to accelerate an automobile from a standing position to its cruising speed. However, the average automobile must have an engine of considerably greater power than is required to maintain it at its normal cruising speed. This is because an internal combustion engine has relatively low torque at low speeds. Thus, the internal combustion engine in an automobile must be made relatively powerful to provide acceptable acceleration.

In contrast, a direct current electric motor develops its greatest torque at low speeds. Therefore, a combined hybrid power plant for an automobile having a relatively small internal combustion engine (for example, approximately 20 horsepower for a small automobile) combined with a direct current electric motor will provide a relatively uniform torque over the speed ranges of the internal combustion engine and electric motor. Internal combustion-electric motor hybrid power plants for automobiles have been proposed in the past but apparently have met only limited success.

It has also been known in the prior art that a major portion of the energy developed by the burning of fuel in an internal combustion engine is lost as heat through exhaust and cooling. As a matter of fact, more energy is lost in this manner than is delivered as usable energy to the crank shaft. For example, it is believed that approximately 2.8 times as much energy is lost through exhaust and cooling as is delivered to the engine crank shaft. The foregoing would indicate that an internal combustion engine having approximately 20 horsepower output to the crank shaft loses approximately 56 horsepower in heat through exhaust and cooling. If approximately one-third of this energy loss could be recaptured, the efficiency of the internal combustion engine would be doubled. In other words, the fuel consumption for a given power output would be cut in half.

SUMMARY OF THE INVENTION

This invention is directed to an internal combustion-electric motor hybrid power plant for an automobile vehicle which utilizes the waste heat of the internal combustion engine to generate energy to help propel the vehicle.

An object of this invention is a hybrid power plant for an automotive vehicle that greatly increases the fuel mileage of the vehicle.

Another object of this invention is a hybrid power plant for an automotive vehicle which converts waste heat into electrical energy to help propel the vehicle.

Another object of this invention is an internal combustion-electric motor hybrid power plant which utilizes thermoelectric semi-conductors to convert waste heat from the internal combustion engine into electric power to drive the electric motor.

Another object of this invention is an internal combustion-electric motor hybrid power plant which utilizes both the heat of exhaust and the heat removed by cooling of the internal combustion engine to provide electrical energy to drive the electric motor.

Another object of this invention is a hybrid power plant for a vehicle which utilizes solar panels to assist in propelling the vehicle.

Other objects may be found in the following specification, claims and drawings.

BRIEF DESCRIPTION OF THE DRAWINGS

The invention is illustrated more or less diagrammatically in the following drawings wherein.

DESCRIPTION OF THE PREFERRED EMBODIMENT

Figure 1:
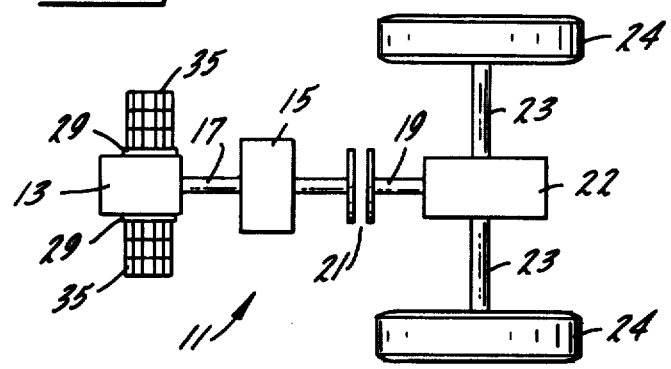
FIG. 1 is a schematic view of the hybrid power plant of this invention connected to the drive wheels of a vehicle.

An internal combustion-electric hybrid power plant intended for installation in an automotive vehicle is shown schemmatically in FIG. 1 of the drawings. The hybrid power plant 11 includes an internal combustion engine 13 which may conventionally be of the gasoline powered type. However, it should be understood that the internal combustion engine could also be a diesel engine or a stratified charge engine. Furthermore, it is within the scope of this invention to use a gas turbine as the internal combustion engine. Since the internal combustion engine will be relatively small in comparison to engines currently used in automotive vehicles, a one or two cylinder gasoline engine of approximately 20 horsepower may be sufficient for a relatively small automobile such as one of the size of a Volkswagon "BEETLE" automobile. While water cooled internal combustion engines may be used, air cooled engines are more satisfactory and desirable because of their lighter weight and lower cost.

A direct current motor generator 15 is connected to the crank shaft 17 of the internal combustion engine 13. The size of the direct current motor generator will vary in accordance with the weight of the automobile in which the hybrid power plant is installed, but it will have to have sufficient torque so that it and the relatively small internal combustion engine 13 will have sufficient power to accelerate the automobile from a standing position to its cruising speed within a reasonable period of time. The direct current motor generator 15 may also be used to crank the internal combustion engine 13 for starting purposes.

The crank shaft 17 of the internal combustion engine 13 is also the shaft of direct current motor 15. This shaft is connected to a drive shaft 19 by means of a clutch 21. A suitable transmission 22, either automatic or manual, is provided. The transmission drives the vehicle drive axle 23, front or rear, on which wheels 24 are installed. One or more automotive type storage batteries 27 is provided. The number and capacity of the storage batteries will be determined by the size of the direct current motor generator 15.

Figure 5:
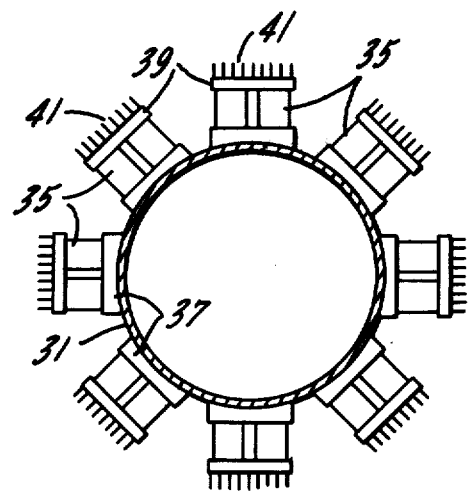
FIG. 5 is a cross-sectional view showing thermoelectric semi-conductors mounted on the internal combustion engine exhaust pipe.

The internal combustion engine 13 is equipped with one or more power cylinders 29 in which fuel is burned. Each power cylinder has one or more exhaust pipes 31 (FIG. 5) which lead to a suitable muffler and tail pipe, neither of which is shown in the drawings. If the internal combustion engine 13 is equipped with more than one power cylinder, the exhaust pipes 31 from each cylinder may be manifolded before connecting to the muffler and tail pipe.

Figure 2:
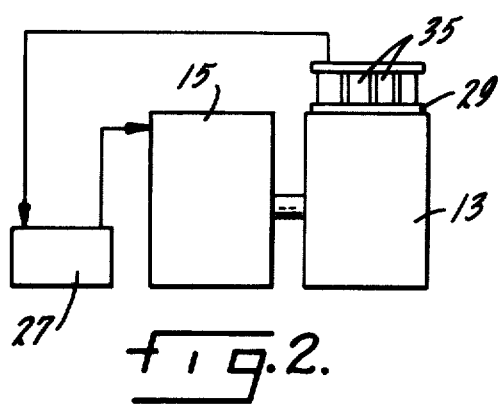
FIG. 2 is a schematic view of the hybrid power plant of this invention showing the flow of electrical energy during acceleration of the vehicle.
Figure 3:
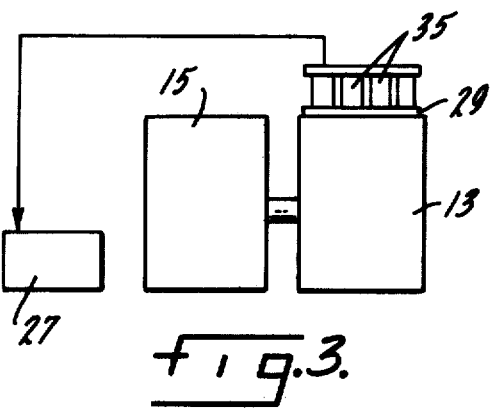
FIG. 3 is a view similar to that of FIG. 2 but showing the flow of electrical energy when the vehicle is at its cruising speed.
Figure 4:
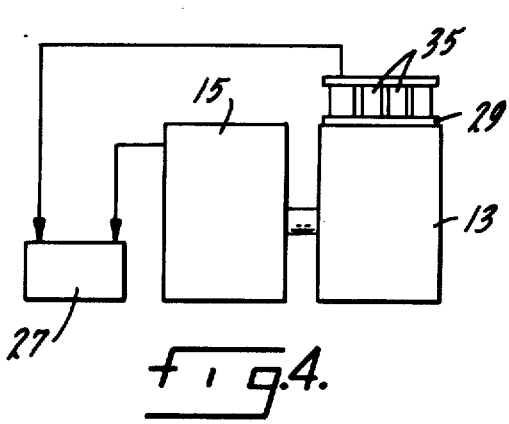
FIG. 4 is a view similar to that of FIG. 2 but showing the flow of electrical energy when the vehicle is decelerating or idling.

The waste heat of the internal combustion engine 13 is recovered by thermoelectric semi-conductors 35 which are mounted on the exhaust pipes 31 (FIG. 5) and on the outer walls of the power cylinders 29 (FIGS. 2, 3 and 4). The number and capacity of the thermoelectric semi-conductors may be varied in accordance with the maximum amount of current that can be received by the batteries 23. The thermoelectric semi-conductors are arranged with their hot sides 37 against the exterior walls of the exhaust pipes and cylinders and the cold sides 39 located away from these heated surfaces. The cold sides 39 of the semi-conductors may be equipped with fins 41 to radiate heat and increase the electrical efficiency of the thermoelectric semi-conductors.

Wiring which is not shown in detail but is shown schematically in FIGS. 2, 3 and 4 connects the thermoelectric semi-conductors to the storage batteries 27 so that current generated by the thermoelectric semi-conductors can be delivered to the storage battery. It may be desirable to provide a flow of cooling air across the fins 41 of the thermoelectric semi-conductors 35. This can be arranged by suitable blowers and ducting.

The use, operation, and function of this invention are as follows:

The greatest demand which is placed on the hybrid power plant of this invention will occur during acceleration of the automotive vehicle from a standing position to its normal cruising speed. This condition is shown schematically in FIG. 2. During acceleration, both the internal combustion engine 13 and the direct current motor 15 will be required to deliver maximum torque to the vehicle drive shaft 19. The direct current motor will be drawing maximum current flow from the battery or batteries 27. Additionally, a small amount of current will be generated by the thermoelectric semi-conductors 35 and this will be supplied to the storage battery. The flow of electrical current is depicted by the arrows. Due to the combination of high torque developed by the direct current motor and the relatively small torque obtained from the internal combustion engine, it will be possible to rapidly accelerate the automotive vehicle to its cruising speed.

When the automotive vehicle reaches its normal cruising speed, the direct current motor 15 is shunted out and the automotive vehicle runs on only the power of the internal combustion engine 13. This condition is shown in FIG. 3. The batteries will be recharging from current generated by the thermoelectric semi-conductors 35 which are recovering some of the exhaust heat and waste heat of the internal combustion engine. The flow of electrical current is depicted by the arrows. After the batteries have been recharged, the current obtained from the thermoelectric semi-conductors can be passed through the battery and used to drive the direct current motor 15. This will permit the output of the internal combustion engine 13 to be decreased while maintaining the vehicle at the same cruising speed.

When the automobile is stopped, for example, at a traffic light and when it is decelerating, the direct current motor 15 can be converted to a generator and the electrical energy obtained therefrom used to recharge the storage batteries 23. This condition is shown in FIG. 4. Of course, at the same time, additional current for recharging the batteries will be obtained from the thermoelectric semi-conductors which are recapturing the waste heat and exhaust heat from the internal combustion engine 13. Additional, electrical energy to recharge the batteries may also be obtained from solar panels located on the roof of the vehicle.

While the invention has been described in connection with an internal combustion engine used to power an automotive vehicle, it should be understood that this invention is also applicable to stationary and mobile power plants of all types where heat is customarily lost through exhaust and cooling.

From the foregoing, it can be seen that the hybrid internal combustion engine-electric motor power plant of this invention is capable of providing maximum thermal efficiency for an automotive vehicle. Therefore, the scope of this invention should be limited only by a liberal interpretation of the claims appended hereto.

I claim:

1. An internal combustion-electric hybrid power plant including:
   an internal combustion engine,
   a direct current electric motor generator,
   a drive shaft,
   means connecting said internal combustion engine, said direct current electric motor generator and said drive shaft for selectively engaging and disengaging the drive shaft with said internal combustion engine and said motor generator,
   at least one electric storage battery electrically connected to said motor generator to supply current to and receive current therefrom,
   thermoelectric semi-conductors arranged to be heated by the waste heat of said internal combustion engine,
   said thermoelectric semi-conductors electrically connected to said battery to supply current thereto.

2. The hybrid power plant of claim 1 in which said thermoelectric semi-conductors are heated by the exhaust gas of said internal combustion engine.

3. The hybrid power plant of claim 2 in which said thermoelectric semi-conductors are positioned in contact with the outer surface of the internal combustion engine exhaust pipe.

4. The hybrid power plant of claim 1 in which said thermoelectric semi-conductors are heated by the cylinder walls of said internal combustion engine.

5. The hybrid power plant of claim 4 in which the thermoelectric semi-conductors are positioned in contact with the outer surfaces of the cylinder walls of said internal combustion engine.

* * * * *